United States Patent [19]

Yasukawa

[11] Patent Number: 4,637,771
[45] Date of Patent: Jan. 20, 1987

[54] LIFTING HEAD OF SWIVEL ARM OF ASSEMBLY ROBOT

[75] Inventor: Kazuyoshi Yasukawa, Nagano, Japan

[73] Assignee: Kabushiki Kaisha Sankyo Seiki Seisakusho, Japan

[21] Appl. No.: 710,268

[22] Filed: Mar. 11, 1985

[30] Foreign Application Priority Data

Mar. 12, 1984 [JP] Japan .............................. 59-34131[U]

[51] Int. Cl.⁴ ............................................ B25J 15/00
[52] U.S. Cl. ...................................... 414/590; 901/17; 901/21; 901/23
[58] Field of Search ....................... 901/16, 17, 18, 14, 901/19, 21, 22, 25, 26, 27, 28, 29, 36; 414/744 R, 744 A, 744 B, 744 C, 751, 752, 737, 732, 590, 589; 74/25

[56] References Cited

U.S. PATENT DOCUMENTS

| | | | |
|---|---|---|---|
| 4,220,170 | 9/1980 | Herbert et al. | 901/22 X |
| 4,428,710 | 1/1984 | Grisebach et al. | 901/29 X |
| 4,466,770 | 8/1984 | Peroutky | 414/751 |
| 4,518,298 | 5/1985 | Yasukawa | 901/16 X |
| 4,543,638 | 9/1985 | Scarffe | 901/22 X |

*Primary Examiner*—Terrance L. Siemens

*Attorney, Agent, or Firm*—Sughrue, Mion, Zinn, Macpeak, and Seas

[57] ABSTRACT

A lifting head of a swivel arm of an assembly robot having an increased stroke of a lifting shaft and a reduced overall weight. A pair of guide bars are fixedly provided on the swivel arm extending parallel thereto, and a feed screw rotatably supported on the swivel arm extends parallel to the guide bars. A holding plate is fixed to the upper side of the swivel arm. A supporting member is secured to an upper end of the holding plate, the supporting member supporting the upper end portions of the guide bars and rotatably supporting upper end portions of the feed screw. A cylindrical guide having an inner wall of noncircular section is rotatably supported by the swivel arm. A lifting shaft slidably inserted into the cylindrical guide has an upper end portion rotatably supported by the nut member and has a fluid passage formed therein, an upper end of which is coupled to a fluid pipe. A rotating pulley is provided at the lower end of the cylindrical guide. A cover is secured to the swivel arm covering the guide bars and feed screw. The cover includes a pair of guide rollers and a hole at the top portion thereof, with the guide rollers being supported on both sides of the hole and the pipe extending through the hole and being guided by the guide rollers.

8 Claims, 7 Drawing Figures

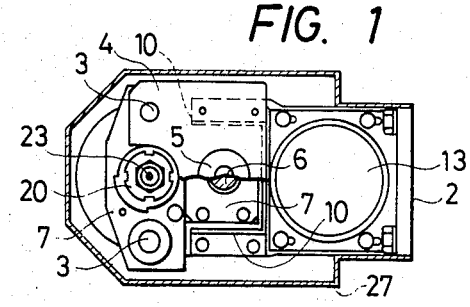
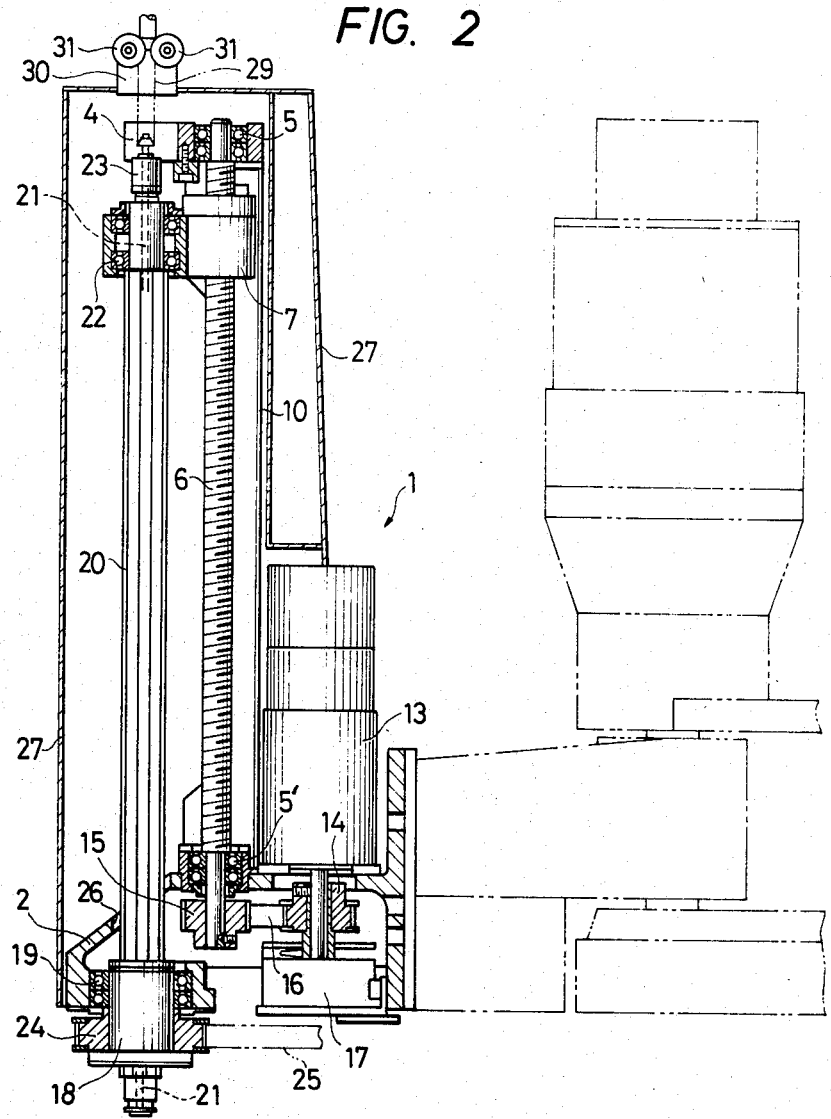

LIFTING HEAD OF SWIVEL ARM OF ASSEMBLY ROBOT

BACKGROUND OF THE INVENTION

The invention relates to the structure of a lifting head coupled to a swivel arm of an assembly robot or the like.

In a swivel-arm type assembly robot, the swivel arm has a chuck mounted at the end thereof. The chuck is supported by a lifting shaft which is rotatable. The lifting shaft is turned and moved vertically to supply or assemble workpieces or parts. If it is required to perform rotation and vertical movement with high positioning accuracy, the chuck is driven by a servo-controlled feed screw or drive motor.

However, if a feed screw mechanism or driven motor is installed on the head of the swivel arm, the total weight of the head is significantly increased, and therefore the movement of the robot becomes slow and the maximum weight of a part or workpiece carried thereby is limited. Accordingly, the weight of such a lifting head should be reduced as much as possible.

In order to satisfy this requirement, the present applicant has proposed a so-called "double-support structure" in which a vertical feed screw is rotatably supported with respect to the head, and the upper end portion of the feed screw is rotatably supported by a part of the casing. However, this structure still suffers from the difficulties that, as the vertical stroke increases, the positioning accuracy drops, and it is rather difficult to significantly reduce its weight.

In the use of a fluid-operated chuck, a pipe extending from the robot body must be connected to the chuck. In the case where the pipe is connected directly to the side of the chucks, the lift and rotation of the chuck are limited thereby, and therefore it is preferable to restrict the passages to inside the lifting shaft. In such a case, the fluid passage is communicated through the pipe with the robot body.

As the lifting shaft is moved up and down, the pipe is also, may strike the cover, etc., and a component of the force in the direction of the pipe exerted on the lifting shaft, thus lowering the positioning accuracy.

SUMMARY OF THE INVENTION

Accordingly, an object of the invention is to increase the stroke of a lifting shaft of this type, to decrease the weight thereof, and to prevent the occurrence of problems due to the presence of the fluid pipe.

In a lifting head according to the invention, a feed screw and guide bars for guiding a nut member have upper and lower end portions held in a double-support manner by a swivel arm and a holding plate secured to the swivel arm. A cover is provided above the swivel arm. Rollers are installed on the cover to guide the pipe of a lifting shaft so that the pipe is separated from the structures which support the feed screw, etc.

BRIEF DESCRIPTION OF THE DRAWINGS

FIG. 1 is a plan view, with parts cut away, showing a lifting head according to the invention;

FIG. 2 is a vertical sectional side view of the lifting head;

DESCRIPTION OF THE PREFERRED EMBODIMENTS

Figure 3:
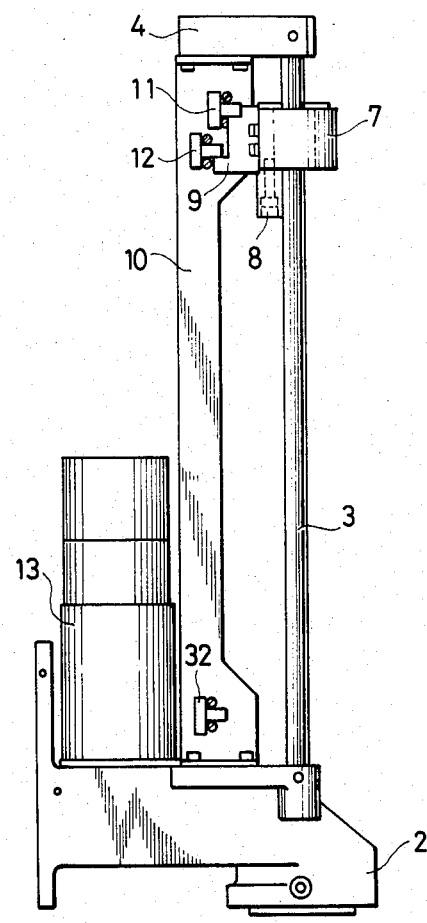
FIG. 3 is an external view of the lifting head coupled to a swivel arm.
Figure 4:
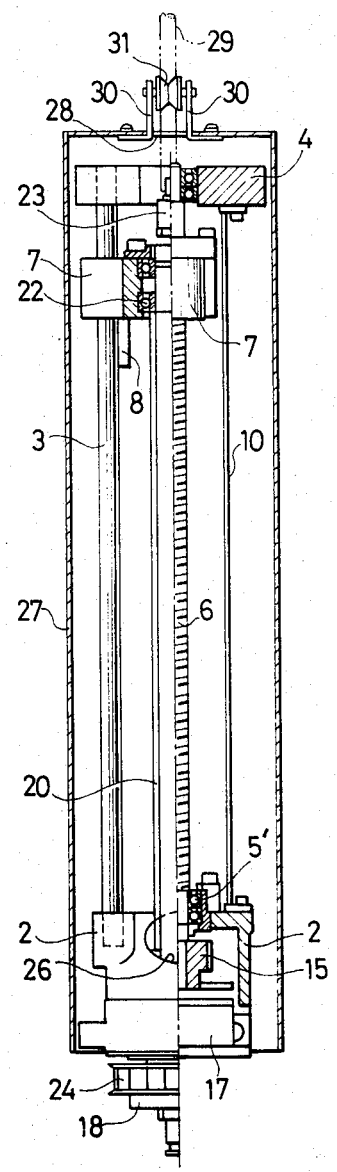
FIG. 4 is a side view, with half in section, showing guide bars and a supporting member which are coupled together.

A preferred embodiment of the invention will be described with reference to FIGS. 1 through 4 in detail.

A lifting head 1 according to the invention is coupled to a swivel arm 2 of an assembly robot or the like. Two guide bars 3 are held on the swivel arm 2, extending vertically and parallel to one another. The upper end portions of the guide bars are coupled through a supporting member 4. The supporting member 4 and the swivel arm 2 rotatably support a feed screw 6 through upper and lower bearings 5 and 5'. The feed screw 6 has a middle part engaged with a nut member 7. The nut member 7 has its right and left parts slidably mounted on the guide bars 3. The nut member 7 has a stop 8 at the lower end and a staircase-shaped dog 9 on the side.

A holding plate 10 U-shaped in section is provided between the swivel arm 2 and the supporting member 4. Two position detecting switches 11 and 12 are provided on the upper portion of the holding plate 10 at such positions as to be able to engage with the dog 9. More specifically, the switches 11 and 12 are arranged such that they are staggered vertically and horizontally in correspondence to the steps of the dog 9. One of the two position detecting switches 11 and 12 is for original position detection and the other is for over-run detection. In this embodiment, the switch 11 is for original position detection and the switch 12 is for over-run detection, and the switch 11 is located above the switch 12. If the switch 12 for over-run detection is positioned above the switch 11 for original position detection, then it is necessary to reduce the size of the dog 9, and when over-run actually occurs, the protrusion of the dog 9 will strike the upper switch. Therefore, it is necessary to increase the size of the dog and to increase the distance between the switches. However, in the above-described arrangement, the switches can be set in a minimum space. Another position detecting switch 32 is provided below the switches 11 and 12.

A lifting motor 13 with an encoder is mounted on the swivel arm 2. A timing belt 16 is laid over a pulley 14 mounted on the output shaft of the motor 13 and a pulley 15 mounted on the lower end portion of the feed screw 6. An electromagnetic brake 17 is provided inside the swivel arm 2. The shaft of the brake 17 is coupled to the output shaft of the lifting motor 13.

A bearing 19 at the lower side of the end portion of the swivel arm 2 rotatably supports a cylindrical guide 18. The inner wall of the cylindrical guide 18 has a noncircular part, namely, a female spline, which is slidably engaged with the spline of a lifting shaft 20. A fluid passage 21 is formed inside the lifting shaft 20 extending along the central (longitudinal) axis of the shaft. The lower end of the fluid passage is coupled to a fluid-driven chuck or the like (not shown).

The lifting shaft 20 extends through a hole 26 in the swivel arm 2. The upper end portion of the lifting shaft 20 is coupled through a bearing 22 to the nut member 7 in such a manner that it is not removable from the nut member and is freely rotatable. The upper end portion of the lifting shaft 20 has a rotary joint 23 communicated with the fluid passage 21. A pulley 24 is coupled to the cylindrical guide 18. A timing belt 25 is laid over the pulley 24 to receive torque from the robot body.

The swivel arm 2 is provided with a cover 27. More specifically, the guide bars 3, the supporting member 4 and the lifting shaft 20 are covered with the cover 27, and the lower end portion of the cover is secured to the sides of the swivel arm. It should be noted that the cover 27 is held only by securement of its lower end portion to the sides of the swivel arm 2; that is, it is not secured to the guide bars 3, the supporting member 4 or the lifting shaft 20. The cover 27 has a hole 28 at a position corresponding to the position of the rotary joint 23. A pipe 29 extends through the hole 28 of the cover 27. A pair of groove-type rollers 31 are rotatably held by a pair of supporting plates 30 provided on both sides of the hole 28. The pair of rollers 31 hold the pipe 29 therebetween and guide it towards the robot body.

Figure 5:
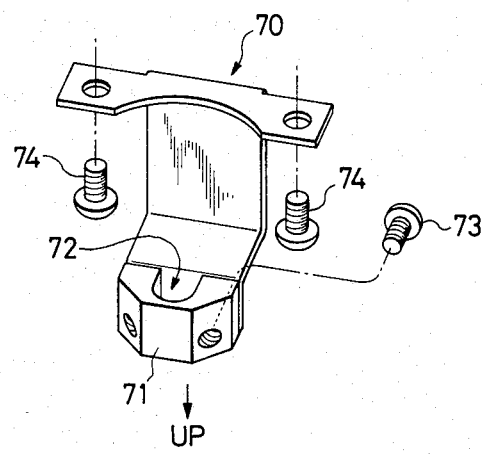
FIG. 5 shows details of a retainer bracket used in the lifting head of the invention.
Figure 5A:
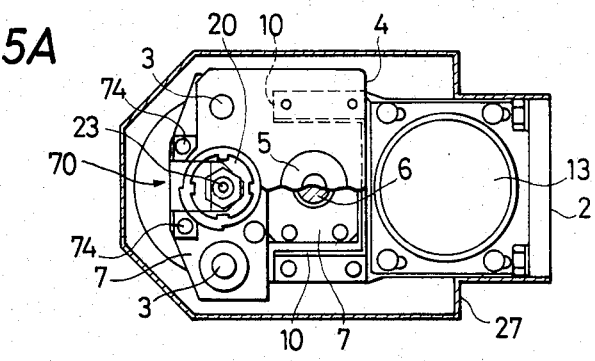
FIGS. 5A and 5B show views similar to FIGS. 1 and 2, but showing the assembled retainer bracket shown in FIG. 5.
Figure 5B:
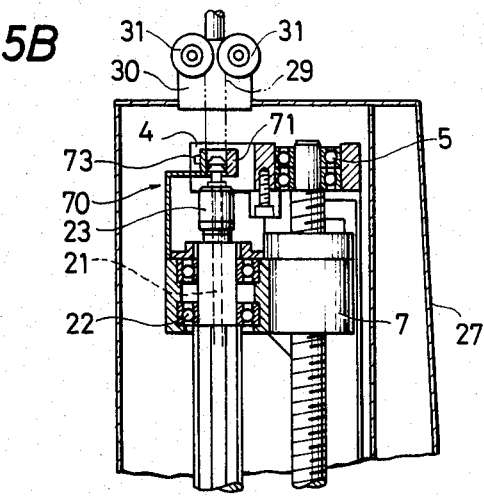

As best shown in FIG. 5, it is preferable for a bracket 70 (not shown in FIGS. 1 to 4) with a retainer 71 to be fixedly secured to the upper surface of the nut member 7 with screws 74. The pipe 29 is inserted into a U-shaped hole 72 in the retainer 71, and is tightened with screws 73 so as to prevent the pipe 29 from turning. It is preferable to tighten the end portion of the pipe 29 which is engaged with the rotary joint 23. FIGS. 5A and 5B show the bracket 70 assembled in the lifting head 1.

The operation of the lifting head thus constructed will be described.

The lifting shaft 20 is rotated by rotating the cylindrical guide 18 by means of the pulley 24 and the timing belt 25. The rotational movement of the cylindrical guide 18 is transmitted through the splines (of noncircular section) to the lifting shaft 20.

The lifting shaft 20 is moved vertically by rotating the lifting motor 13. This action will be described in more detail. The rotation of the lifting motor 13 is transmitted through the pulleys 14 and 15 and the timing belt 16 to the feed screw 6. The feed screw 6 has a lower end portion supported by the bearing 5 of the swivel arm 2, and an upper end portion rotatably supported by the bearing 5 of the supporting member 4. Therefore, the feed screw 6 moves the nut member 7 upwardly or downwardly according to the direction of rotation of the motor while rotating stably. However, since the nut member 7 is guided by the right and left guide bars 3 without being turned, the lifting shaft 20 is moved vertically. As the lifting shaft 20 has its lower end portion supported by the nut member 7, the lifting shaft 20 is stably and accurately moved vertically.

While the lifting motor 13 is in operation, the electromagnetic brake 17 is not in operation, that is, it produces no braking force. However, when the lifting motor 13 stops, the electromagnetic brake 17 produces a braking force to stop the rotation of the feed screw 6. The amount of rotation of the feed screw, and accordingly the amount of movement of the nut member 7, can be accurately set employing well-known servo control techniques. Even if, in this operation, the electromagnetic brake 17 generates heat, the feed screw 6 is not affected by the heat of the electromagnetic brake 17 and continues to operate accurately because the electromagnetic brake 17 is not directly coupled to the feed screw 6.

When the lifting shaft 20 is moved vertically, the pipe 29 is also moved vertically. In this operation, the pipe 29, being guided by the pair of groove-type rollers 31, is moved in the axial direction of the lifting shaft 20. Therefore, even if a horizontal force is applied to the pipe 29, it will not directly affect the lifting shaft 20 because the horizontal force is received by the cover 27.

While the invention has been described with reference to the case where the lifting head 1 is coupled to the swivel arm 2 of the assembly robot, the invention is not limited thereby or thereto. For instance, the lifting head 1 may be coupled to manipulators or other machining devices.

The invention has the following merits and effects:

The pair of parallel guide bars, the feed screw and the holding plate positively hold both ends of the lifting shaft over the entire stroke thereof. Therefore, the lifting shaft is moved vertically with its two ends held stably, which permits accurate control.

The feed screw and the nut member also support the lifting shaft, and the holding plate holds the position detecting switches which engage with the dog supported by the nut member. Therefore, the number of components necessary for the lifting head and, accordingly, the weight of the lifting head, are reduced, which permits the lifting head to carry a heavier workpiece and to move at a higher speed.

As the pipe of the lifting shaft is guided in the axial direction by the pair of rollers mounted on the cover, the pipe will not twist and will not interfere with the cover or other components.

The structural components supporting the feed screw and the lifting shaft are independent of the cover. Therefore, even if a component of the force of the pipe is exerted on the cover, the lifting head of the invention permits positioning control with high accuracy.

I claim:

1. A lifting head of a swivel arm of an assembly robot comprising:

a pair of guide bars fixedly provided on said swivel arm and extending in parallel;

a feed screw rotatably supported on said swivel arm in such a manner that said feed screw extends parallel to said guide bars;

a nut member engaging said feed screw;

a holding plate fixedly secured to an upper side of said swivel arm;

a supporting member fixedly secured to an upper end of said holding plate, said supporting member fixedly supporting upper end portions of said guide bars and rotatably supporting upper end portions of said feed screw;

a cylindrical guide having an inner wall of noncircular section, said cylindrical guide being rotatably supported by said swivel arm;

a lifting shaft slidably inserted into said cylindrical guide, said lifting shaft having an upper end portion rotatably supported by said nut member for vertical movement therewith and having a fluid passage formed therein, an upper end of which is coupled to a fluid pipe;

a rotating pulley provided at a lower end of said cylindrical guide; and a cover fixedly secured to said swivel arm and covering said guide bars and said feed screw, said cover comprising a pair of guide rollers and having a hole at a top thereof, said guide rollers being supported on both sides of said hole and said pipe extending through said hole and being guided by said guide rollers.

2. The lifting head as claimed in claim 1, further comprising a dog fixedly secured to said nut member, and position detecting switches for said dog mounted on said holding plate.

3. The lifting head as claimed in claim 1, further comprising a rotary joint, an upper end of said lifting shaft being connected through said rotary joint to said pipe so that said fluid passage is communicated with said pipe.

4. The lifting head as claimed in claim 3, further comprising means for preventing said pipe coupled to said rotary joint from turning.

5. The lifting head as claimed in claim 1, further comprising a feed screw driving motor fixedly secured to said swivel arm, and electromagnetic brake means coupled to an output shaft of said motor for stopping rotation of said motor when said motor is deenergized.

6. The lifting head as claimed in claim 5, further comprising an endless belt, said motor being coupled through said endless belt to said feed screw to turn said feed screw.

7. The lifting head as claimed in claim 1, wherein said guide rollers comprise a pair of groove-type guide rollers and said pipe extends in such such a manner as to be held between said groove-type guide rollers.

8. The lifting head as claimed in claim 4, wherein said turning preventing means comprises a bracket for preventing said pipe from turning, said bracket being secured to said supporting member.

* * * * *